(12) United States Patent
Mank et al.

(10) Patent No.: US 11,292,104 B1
(45) Date of Patent: Apr. 5, 2022

(54) PIPE CLAMP APPARATUS AND METHOD

(71) Applicants: William Mank, Santa Rosa Beach, FL (US); Matthew Brunnig, Pinellas Park, FL (US)

(72) Inventors: William Mank, Santa Rosa Beach, FL (US); Matthew Brunnig, Pinellas Park, FL (US)

(*) Notice: Subject to any disclaimer, the term of this patent is extended or adjusted under 35 U.S.C. 154(b) by 0 days.

(21) Appl. No.: 17/356,739

(22) Filed: Jun. 24, 2021

(51) Int. Cl.
*B25B 1/20* (2006.01)
*B23K 37/053* (2006.01)
*B25B 11/02* (2006.01)
*B23K 101/06* (2006.01)

(52) U.S. Cl.
CPC .......... *B25B 1/205* (2013.01); *B23K 37/0533* (2013.01); *B25B 11/02* (2013.01); *B23K 2101/06* (2018.08)

(58) Field of Classification Search
CPC ... F16L 3/00; F16L 3/10; F16L 55/035; F16L 59/135; F16L 1/06; F16L 3/137; B25B 5/147; B25B 27/16; B25B 1/205; B25B 11/02; B23K 37/053; B23K 37/0533; B23K 37/0536
USPC ... 248/65, 74.1, 68.1, 70, 49, 73, 74.4, 74.3; 269/131, 130; 29/237, 243.55, 271, 29/243.51
See application file for complete search history.

(56) References Cited

U.S. PATENT DOCUMENTS

| | | | | |
|---|---|---|---|---|
| 4,070,894 A | * | 1/1978 | Smith | F16G 11/02 |
| | | | | 29/237 |
| 4,943,016 A | * | 7/1990 | Hennecke | F16L 3/14 |
| | | | | 248/59 |
| 6,641,124 B2 | * | 11/2003 | Melanson | B23K 37/0533 |
| | | | | 269/43 |
| 7,004,682 B1 | * | 2/2006 | Moody | B25B 5/10 |
| | | | | 405/184.4 |
| 2018/0085866 A1 | * | 3/2018 | Alaniz | B23K 37/0533 |

* cited by examiner

*Primary Examiner* — Tyrone V Hall, Jr.
*Assistant Examiner* — Abbie E Quann
(74) *Attorney, Agent, or Firm* — J. Nevin Shaffer, Jr.

(57) ABSTRACT

A pipe clamp apparatus and method consists of a pressure block and a pipe wrap connected with the pressure block. A pressure applicator is connected with the pressure block and a pipe alignment guide is connected with the pressure applicator where the pipe alignment guide is configured to receive two separate pipes.

19 Claims, 7 Drawing Sheets

PIPE CLAMP APPARATUS AND METHOD

FIELD OF THE INVENTION

This invention relates to a pipe clamp apparatus and method. In particular, in accordance with one embodiment, the invention relates to a pipe clamp apparatus consisting of a pressure block and a pipe wrap connected with the pressure block. A pressure applicator is connected with the pressure block and a pipe alignment guide is connected with the pressure applicator where the pipe alignment guide is configured to receive two separate pipes.

BACKGROUND OF THE INVENTION

A problem exists in the art of welding, for example only and not by limitation. A major problem with joining two separate pipes together is the difficulty in ensuring the two separate pipes are aligned end to end. Any misalignment adversely affects the subsequent weld and may result in requiring re-alignment and re-welding.

Further, a proper weld requires a proper spacing between the two separate pipes and this spacing is extremely difficult to ensure in most on the job environments. The typical result is a section of welded pipes with varying weld spacing which can result in weakness or failure of some of the welds.

Thus, there is a need in the art for a process that can provide properly aligned pipe ends for welding that is easy to use and that can accommodate a variety of different pipe dimensions.

It therefore is an object of this invention to provide a pipe clamp and process that is efficient, adjustable and inexpensive and that results in properly aligned and properly spaced apart pipe sections for welding.

SUMMARY OF THE INVENTION

Accordingly, the pipe clamp apparatus and method of the present invention, according to one embodiment, includes a pressure block and a pipe wrap connected with the pressure block. A pressure applicator is connected with the pressure block and a pipe alignment guide is connected with the pressure applicator where the pipe alignment guide is configured to receive two separate pipes.

In one aspect, when the pipe wrap is wrapped around the two separate pipes, operation of the pressure applicator forces the pressure block away from the pipe alignment guide.

In another aspect, the pipe wrap is a flexible cable and in one aspect, the flexible cable has a first end and a second end where a cable stop is connected with the first end and the second end and where the cable stops are removably connectable with the pressure block.

In a further aspect, there are multiple cable stops on one end of the flexible cable.

In one aspect, the pipe wrap consists of two separate sections and in another aspect, the pipe wrap is chain.

In one aspect, the pressure applicator is selected from a group consisting of: a threaded screw arm and a ratchet arm In another aspect, the pipe alignment guide is V-shaped.

In one aspect, a second pipe alignment guide is connected with the pipe wrap and the two separate pipes and opposite from the initial pipe alignment guide.

According to another embodiment, a pipe clamp apparatus consists of a pressure block with a first side and a second side, the pressure block configured for application of pressure to a first pipe and a second pipe where the first pipe and the second pipe have a top and a bottom. A pipe wrap with a first end and a second end is provided, where the first end is configured for connection to the first side of the pressure block such that the pipe wrap contacts the top of the first pipe, the second end of the pressure block and the top of the second pipe and where the second end of the pipe wrap is configured for connection with the first side of the pressure block. A pressure applicator is connected with the pressure block and a pipe alignment guide is connected with the pressure applicator where the pipe alignment guide is configured to contact the bottoms of the first pipe and the second pipe such that operation of the pressure applicator tightens the connection of the pipe wrap with the first pipe and the second pipe and such that the first pipe and second pipe are aligned with each other along the pipe alignment guide.

All terms used herein are given their common meaning known to those of ordinary skill in the art, so that, for example, "pipe" describes a tubular form such as found in a hollow water pipe or tube for example only and includes solid pipe forms as with rebar, as well. "Pipe wrap" describes a material used to encircle, at least partially, a pipe and includes cable, wire or otherwise, and chain and any other wrap now known or hereafter developed suitable for the purposes of the present invention. Certainly, the terms must be viewed in light of the description and according to the figures such that arbitrary terms like "top" and "bottom" of a pipe may be properly understood to describe opposite points on a tubular surface, for example.

In one aspect, the pressure applicator includes a weld gap spacer.

According to another embodiment, a pipe clamp method consists of:

a. providing a pressure block with a first side and a second side, the pressure block configured for application of pressure to a first pipe and a second pipe where the first pipe and the second pipe have a top and a bottom; a pipe wrap with a first end and a second end, where the first end is configured for connection to the first side of the pressure block such that the pipe wrap contacts the top of the first pipe and the second end of the pressure block and the top of the second pipe and where the second end of the pipe wrap is configured for connection with the first side of the pressure block; a pressure applicator connected with the pressure block and a pipe alignment guide connected with the pressure applicator where the pipe alignment guide is configured to contact the bottoms of the first pipe and the second pipe such that operation of the pressure applicator tightens the connection of the pipe wrap with the first pipe and the second pipe and such that the first pipe and second pipe are aligned with each other along said pipe alignment guide; and b. wrapping the pipe wrap around the first pipe and the second pipe.

In another aspect, the method further includes operating the pressure applicator until the first pipe is aligned with the second pipe and then welding the first pipe and the second pipe together.

DESCRIPTION OF THE DRAWINGS

Other objects, features and advantages of the present invention will become more fully apparent from the following detailed description of the preferred embodiment, the appended claims and the accompanying drawings in which:

DETAILED DESCRIPTION OF THE INVENTION

Figure 1:
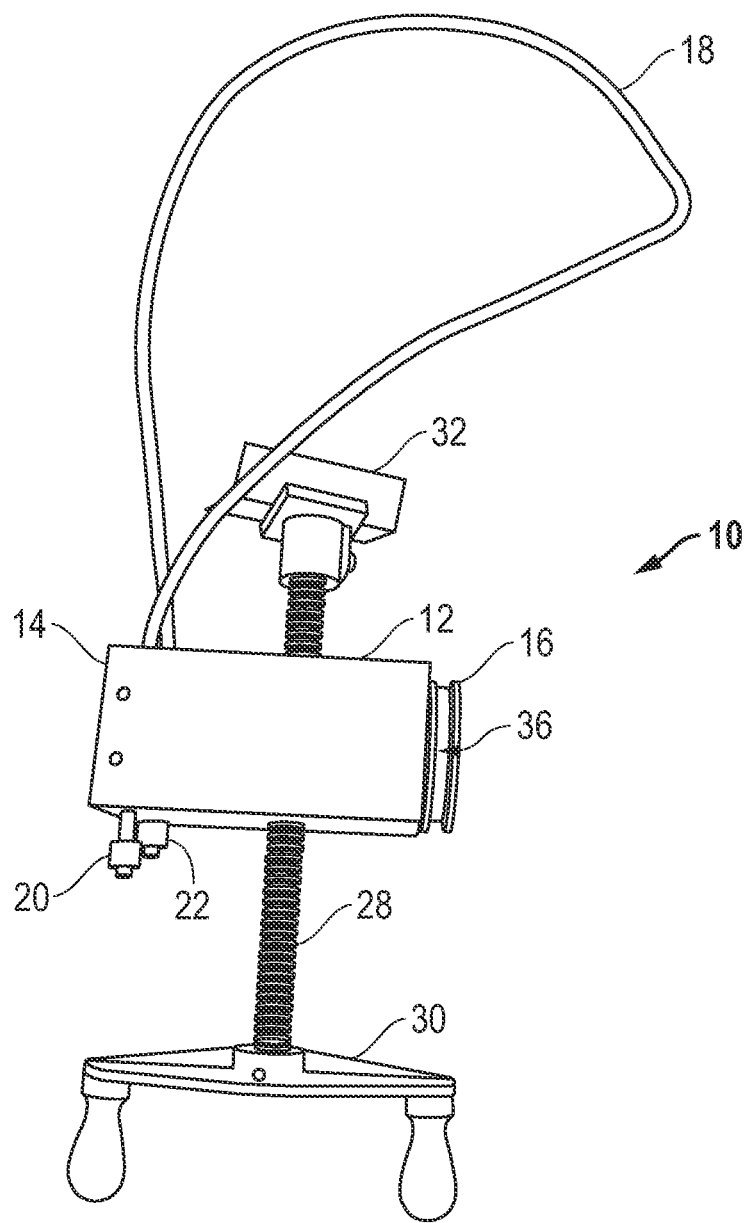
FIG. 1 is a side view of the pipe clamp of the present invention.

Before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the invention be regarded as including equivalent constructions to those described herein insofar as they do not depart from the spirit and scope of the present invention.

For example, the specific sequence of the described process may be altered so that certain processes are conducted in parallel or independent, with other processes, to the extent that the processes are not dependent upon each other. Thus, the specific order of steps described herein is not to be considered implying a specific sequence of steps to perform the process. In alternative embodiments, one or more process steps may be implemented by a user assisted process and/or manually. Other alterations or modifications of the above processes are also contemplated.

In addition, features illustrated or described as part of one embodiment can be used on other embodiments to yield a still further embodiment. Additionally, certain features may be interchanged with similar devices or features not mentioned yet which perform the same or similar functions. It is therefore intended that such modifications and variations are included within the totality of the present invention.

It should also be noted that a plurality of hardware devices, as well as a plurality of different structural components, may be utilized to implement the invention. Furthermore, and as described in subsequent paragraphs, the specific configurations illustrated in the drawings are intended to exemplify embodiments of the invention and that other alternative configurations are possible.

A preferred embodiment of the present invention is illustrated by way of example in FIGS. 1-10. With specific reference to FIGS. 1 and 2, pipe clamp apparatus and method 10 includes a pressure block 12. Pressure block 12 has a first side 14 and a second side 16. Pipe wrap 18 preferably is a single length of wrap and has a first end 20 and a second end 22. Both the first end 20 and the second end 22 are, in use, connected with the pressure block 12 at the first side 14 of pressure block 12. First end 20 and second end 22 are removable from connection with pressure block 12 in order to wrap pipe wrap 18 around two separate pipes (see FIG. 2), first pipe 24 and second pipe 26.

Figure 8:
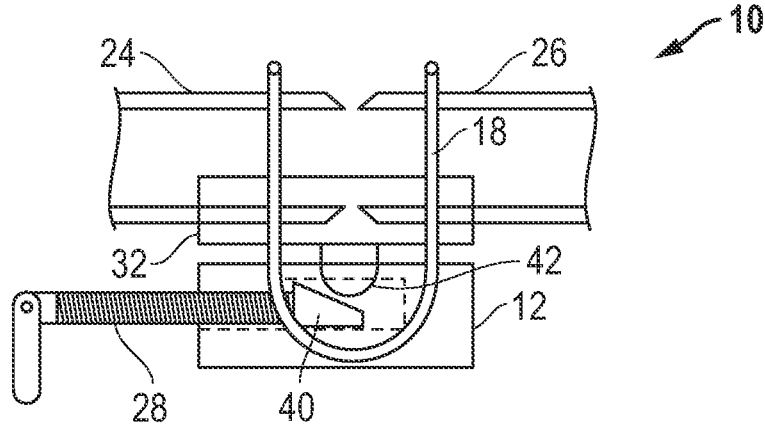
FIG. 8 is a side view of the invention of FIG. 1 with a low profile pressure applicator configuration.

Pressure applicator 28 is connected with the pressure block 12. The connection with pressure block 12 is preferably a threaded connection as shown in FIG. 1 but may also be altered as with a low profile example as shown in FIG. 8 or any other similar connection device suitable for the purposes of the invention. FIG. 1 shows pressure applicator 28 with a handle 30 for ease of use.

Pipe alignment guide 32 is connected with the pressure applicator 28 at the end of pressure applicator 28 opposite from handle 30 as shown. Pipe alignment guide 32 is constructed for contact with two separate pipes 24 and 26. Preferably, pipe alignment guide 32 is V-shaped. Applicants have found this shape enables pipe alignment guide 32 to accommodate pipes with different dimensions. Certainly, pipe alignment guide 32 may be curved to match the curvature of the pipes, for example, or any form or shape deemed suitable for the purposes of the invention.

Figure 2:
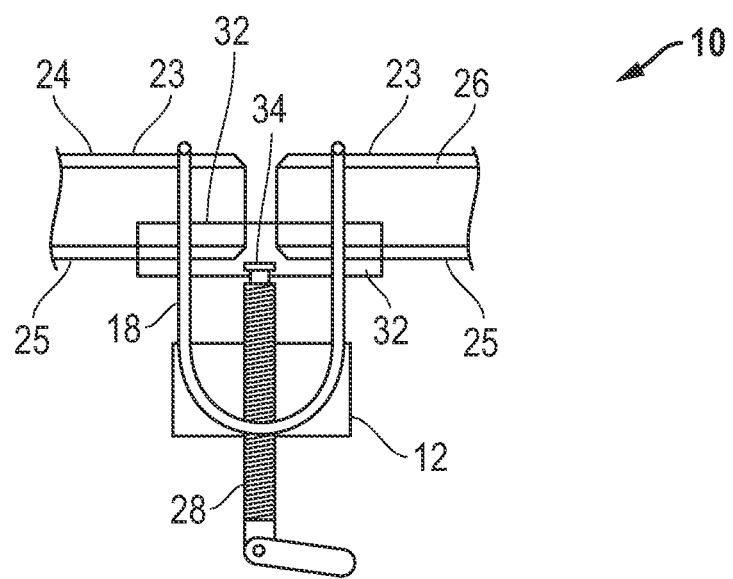
FIG. 2 is a side view of the invention of FIG. 1 shown connected to two separate pipes below the two separate pipes.

FIG. 2 shows first pipe 24, with a top 23 and a bottom 25, and second pipe 26, with a top 23 and a bottom 25, in position in pipe alignment guide 32 and with pipe wrap 18 wrapped around both pipes. Further, weld gap spacer 34 is shown at the end of pressure applicator 28 within pipe alignment guide 32. Weld gap spacer 34 is a solid form with a size equal to the desired preferred space for a weld. The insertion of weld gap spacer 34 between the two pipes prevents them from closing the gap. That is, when present, weld gap spacer 34 enforces a desired gap between first pipe 24 and second pipe 26. As can be understood, operation of the pressure applicator 28 tightens the connection of the pipe wrap 18 with the two separate pipes 24 and 26 such that the two separate pipes are aligned with each other along the pipe alignment guide 32 and separated by the weld gap spacer 34.

Figure 3:
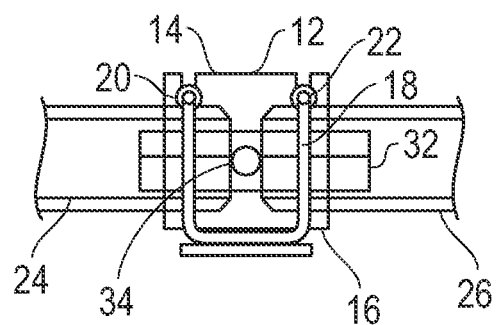
FIG. 3 is a top view of the invention of FIG. 2.

FIG. 3 is a top view of FIG. 2 and shows pipe wrap 18 first end 20 connected with the first side 14 of pressure block 12. From there, pipe wrap 18 wraps around the top 23 of first pipe 24 to the second side 16 of pressure block 12. Preferably, second side 16 has a channel 36 (see FIG. 1 for clarity) in which pipe wrap 18 is held. From there, pipe wrap 18 wraps around the top 23 of second pipe 26 and then the second end 22 of pipe wrap 18 is also connected to the first side 14 of pressure block 12 as shown. Second side 16, channel 36, effectively moves pipe wrap 18 from first pipe 24 over to second pipe 26 such that both pipes are connected with pressure block 12.

At this point, pipe alignment guide 32 connected with pressure applicator 28 contacts the bottoms 25 of the first pipe 24 and the second pipe 26 such that operation of the pressure applicator 28 tightens the connection of the pipe wrap 18 with the first pipe 24 and the second pipe 26 such that the first pipe 24 and second pipe 26 are aligned with each other along the pipe alignment guide 32.

Figure 4:
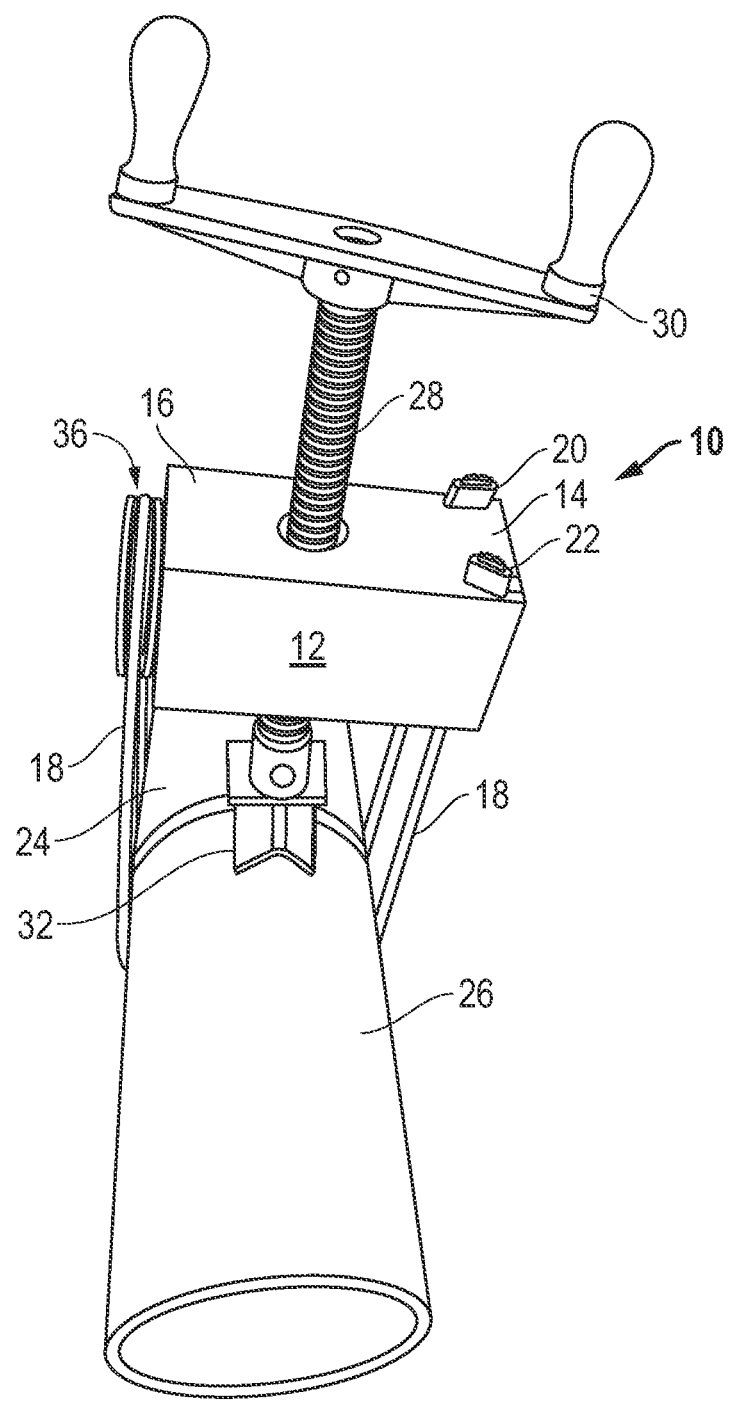
FIG. 4 is a perspective view of the invention of FIG. 1 showing the pipe clamp above the two separate pipes and from one end of the two separate pipes.
Figure 5:
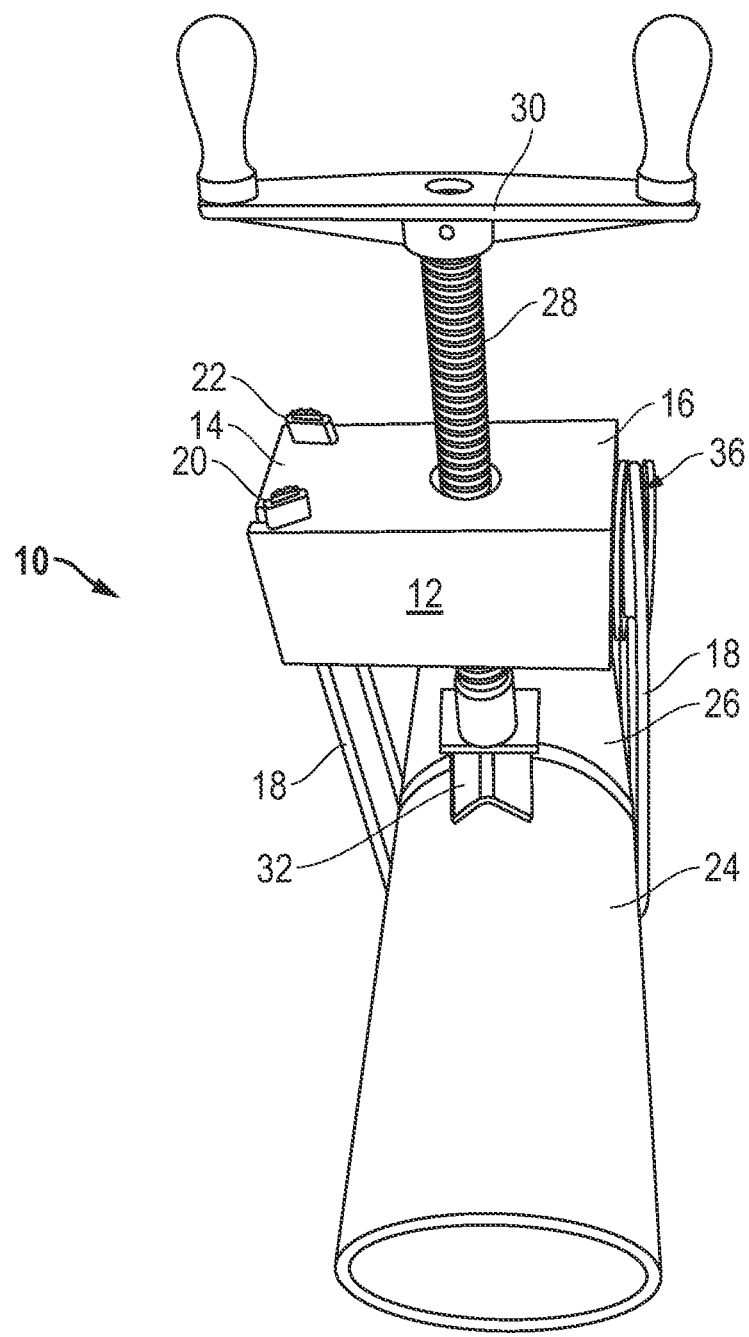
FIG. 5 is a perspective view of the invention of FIG. 4 showing the pipe clamp above the two separate pipes and from the opposite end of the two separate pipes.
Figure 6:
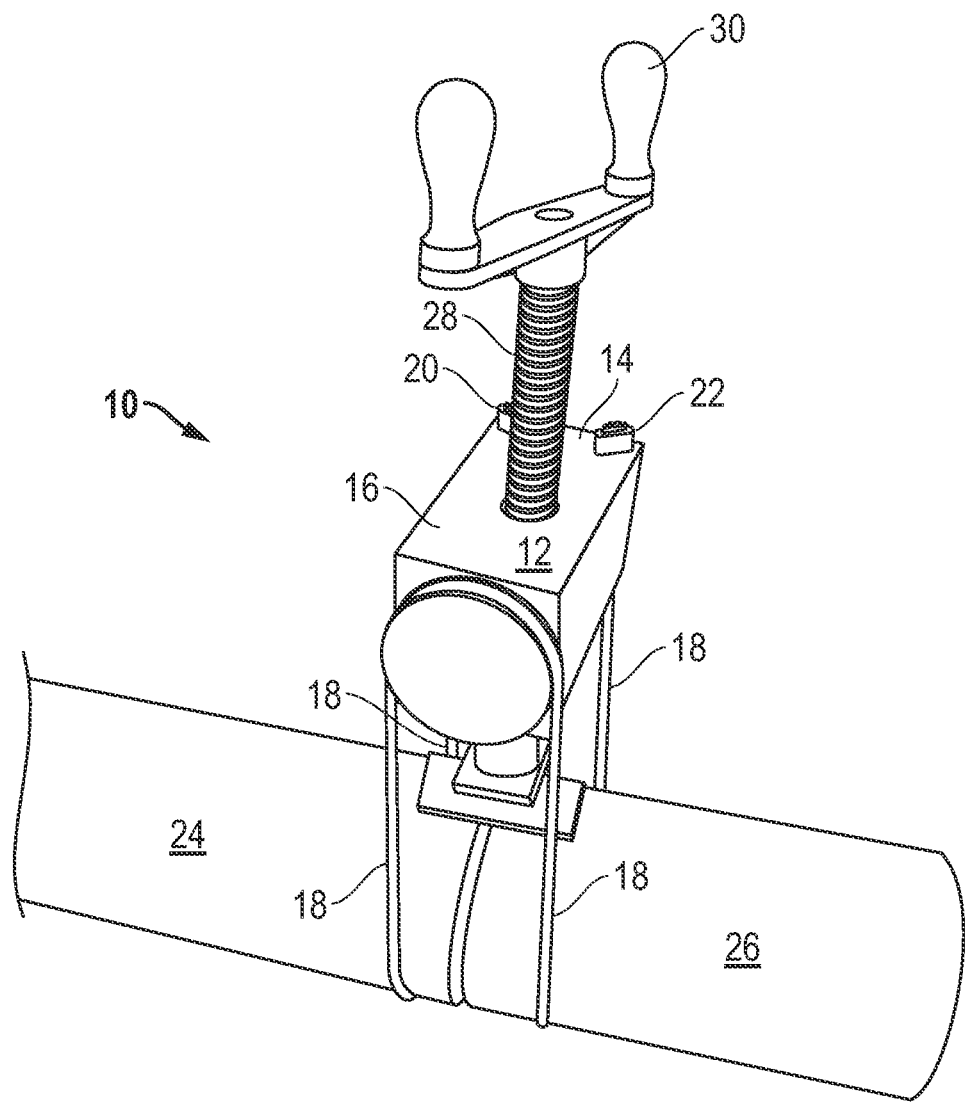
FIG. 6 is a side view of the invention of FIG. 5.

FIGS. 4-6 show pipe clamp apparatus 10 above the pipes for clarity and comparison with FIGS. 1-3. Certainly, any orientation of the invention with regard to the pipes found useful is suitable. FIG. 4 shows pressure block 12 and other elements of the invention as described above from one side and FIG. 5 shows the elements from the opposite side of the pressure block 12. FIG. 6 shows the elements of the invention from the second side 16 of pressure block 12 and shows how pipe wrap 18 is moved over from first pipe 24 to second pipe 26 by means of the width and structure of channel 36, for example only and not by limitation, the width of pressure block 12.

Figure 7:
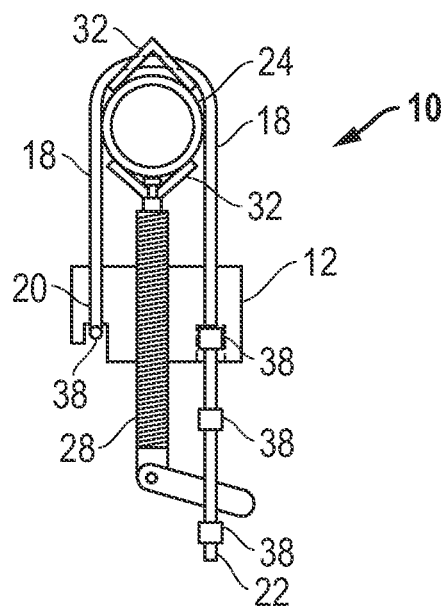
FIG. 7 is an end view the invention of FIG. 1 with a second pipe alignment guide and multiple cable stops on one end of the cable wrap.

Referring now to FIG. 7, cable stops 38 are shown. Applicants have determined that first end 20 of pipe wrap 18 with one cable stop 38 effectively removably connects first end 20 with pressure block 12. Further, Applicants have found that multiple cable stops 38 at the second end 22 of pipe wrap 18 are useful. The user can accommodate pipes with various dimensions, for example, by simply using the cable stop 38 at the second end 22 that fits the pipes the best. Certainly, one end of the pressure block 12 may have an independent clamping mechanism such that cable stops are not needed and adjustment of the pipe wrap 18 is, in effect, infinite.

FIG. 7 also shows another feature where a second pipe alignment guide 32 is used. As shown, it may be useful to help properly align the two separate pipes to use a second pipe alignment guide 32 directly opposite, for example, the first one. The pipes are then sandwiched between them without affecting the operation of the apparatus in any manner.

FIG. 8 illustrates a low profile example of the present invention for use in tight or constricted spaces in which pressure applicator 28 is connected with pressure block 12 from the side of pressure block 12 as shown. Pressure applicator 28 includes a wedge 40 which contacts a pressure point 42 on pipe alignment guide 32. Operation of pressure applicator 28 drives wedge 40 underneath pressure point 42 and forces pipe alignment guide 32 into contact with the pipes. This is just one method on how that could be done, there are a variety of methods with which the pressure block can be pushed away from the pipe's in a low profile design.

Figure 9:
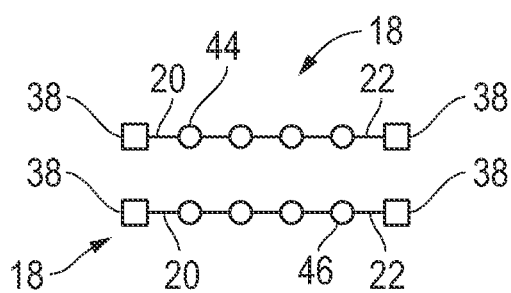
FIG. 9 is a side view of two separate sections of chain pipe wrap of the invention of FIG. 1.

FIG. 9 illustrates a pipe wrap 18 in a chain format and in two separate sections 44 and 46. In this embodiment, the first end 20 of both sections are connected with one side of pressure block 12 and the second ends 22 are connected with the other side of pressure block 12. The channel 36 used to space the pipe wrap 18 from one pipe to another is not required and otherwise the invention operates as described above.

Figure 10:
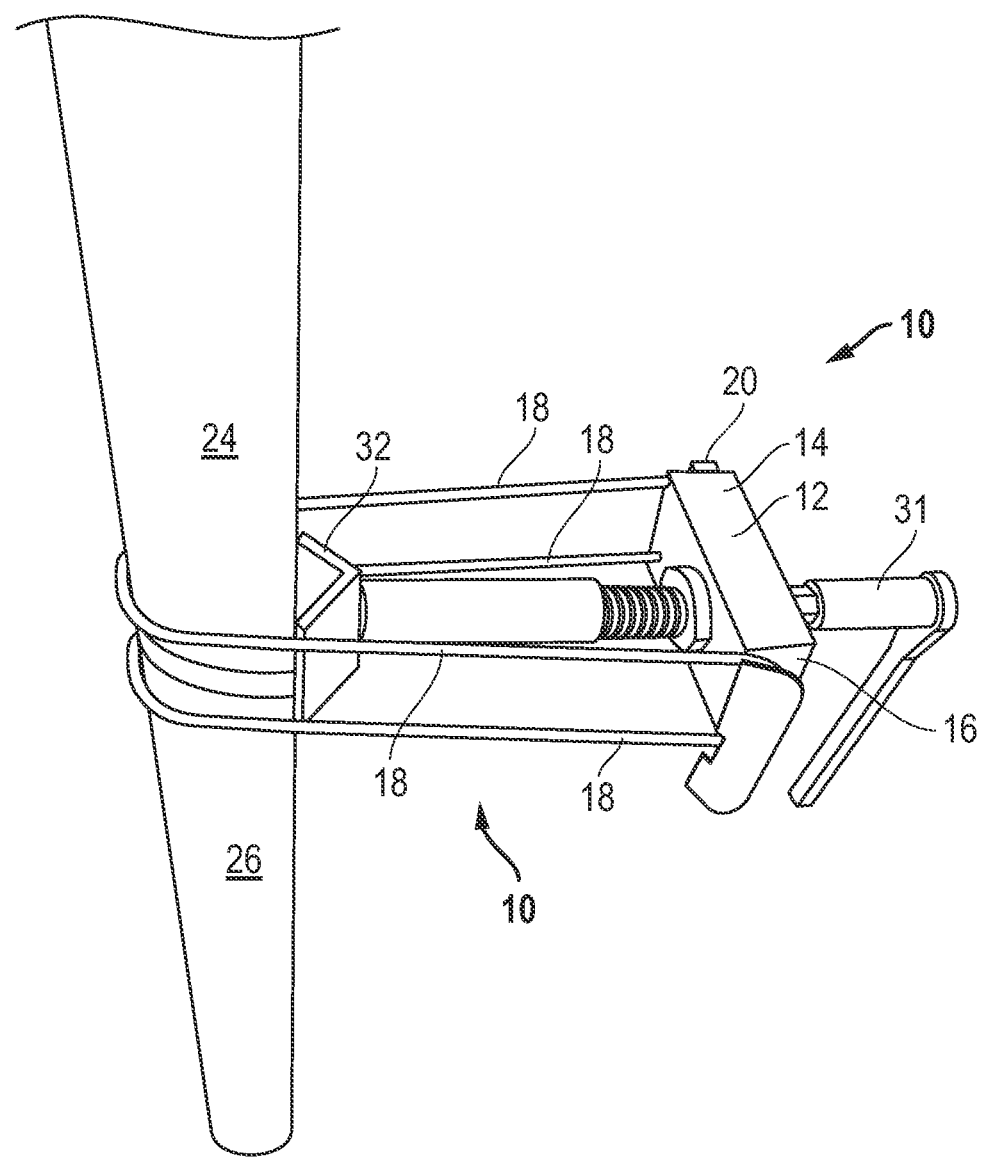
FIG. 10 is a perspective view of the invention of FIG. 1 shown attached with pipes positioned vertically and with a ratchet handle attached to the pressure applicator.

FIG. 10 illustrates the pipe clamp apparatus 10 attached with pipes which are vertically positioned. Additionally, a ratchet handle 31 is shown instead of handle 30 as shown in FIG. 1. This use of a ratchet mechanism is useful in restricted conditions as may be found in any work place.

By way of further description, Applicants have developed a device that is useful for helping clamp/align tubes for fitting them when welding. At its simplest, the invention consists of: a pipe wrap, a pressure block, a pressure application mechanism, and an alignment bed. Preferably, the pipe wrap that wraps around the pipe is flexible and preferably consists of a single piece of cable although it could also be composed of two separate pieces of cable or of two pieces of chain. Applicants have determined that the single cable design has a significant benefit in allowing the pressure between sides to be balanced as they share the same cable tension in a way that would not work as well if there were two pieces of cable or strap.

The pipe wrap of the present design has a crimp on it at one end, a cable stop, that keeps it from being pulled through the pressure block. The pipe wrap then wraps around one of the pipes to be clamped, back around the other side of the pressure block, around the other pipe to be clamped and is then locked into the pressure block with a crimp at the necessary location on the other end of the cable. A pressure applicator, screw, mechanism runs through the pressure block and terminates in a V-Bed, pipe alignment guide. It should be clear that the screw mechanism turns freely in relation to the V-Bed allowing the screw to be turned without affecting the orientation of the V-Bed. After the cable is in place, the screw is turned until the V-Bed is against the pipes at which point the pressure block is pushed away from the pipes thus applying tension to the pipe wrap cable(s). The cable then acts to clamp the pipes to the V-Bed bringing the pipes into proper axial alignment with each other which is necessary for a good weldment.

Applicants believe this novel design allows greatly increased accessibility to the area to be welded which allows welds to be made faster and in higher quality. It also allows work to be done in areas in which it is currently difficult.

There are several alternative embodiments encompassed by the present invention.

1. There are multiple ways that the pressure block can be pushed away from the pipes including, for example, a low profile alternative design option as shown in FIG. 8 for more difficult to access work areas.

2. It is possible to use an opposing V-Bed, pipe alignment guide, threaded onto the cables as shown in FIG. 7 which in some situations is preferable to just the pipe wrap and single alignment guide.

3. Some implementations of the present invention include a ratcheting mechanism on the end of the pressure applicator as described above and shown in FIG. 10.

4. It is useful to include a weld spacer 34. Tube or pipe welds have an ideal spacing between the ends of them, often about 3/32". Providing a weld gap spacer 38 in the V-Bed allows a user to set the ideal gap.

5. The pipe wrap cable can have multiple crimp or cable stops on it to allow it to fit a variety of tube or pipe sizes. Alternatively, the pressure block can have a built-in cable clamping mechanism to allow for infinitely adjustable cable.

6. The V-Bed, pipe alignment guide, can be interchangeable to allow it to have optimal geometry for a variety of tube and pipe sizes and dimensions The description of the present embodiments of the invention has been for purposes of illustration, but is not intended to be exhaustive or to limit the invention to the form disclosed. Many modifications and variations will be apparent to those of ordinary skill in the art. As such, while the present invention has been disclosed in connection with an embodiment thereof, it should be understood that other embodiments may fall within the spirit and scope of the invention as defined by the following claims.

What is claimed is:

1. A pipe clamp apparatus comprising:
   a. a pressure block;
   b. a pipe wrap connected with said pressure block wherein said pipe wrap is a flexible cable wherein said flexible cable has a first end and a second end and wherein a cable stop is connected with the first end and the second end and wherein said cable stops are removably connectable with said pressure block and wherein there are multiple cable stops on one end of said flexible cable;
   c. a pressure applicator connected with said pressure block; and
   d. a pipe alignment guide connected with said pressure applicator wherein said pipe alignment guide is configured to receive two separate pipes.

2. The apparatus of claim 1 when said pipe wrap is wrapped around said two separate pipes, operation of said pressure applicator forces said pressure block away from said pipe alignment guide.

3. The apparatus of claim 1 wherein said pipe wrap consists of two separate sections.

4. The apparatus of claim 1 wherein said pipe wrap is chain.

5. The apparatus of claim 1 wherein said pressure applicator is selected from a group consisting of: a threaded screw arm and a ratchet arm.

6. The apparatus of claim 1 wherein the pipe alignment guide is V-shaped.

7. The apparatus of claim 1 further including a second pipe alignment guide connected with the pipe wrap and the two separate pipes and opposite the pipe alignment guide.

8. The apparatus of claim 1 wherein the pressure applicator includes a weld gap spacer.

9. A pipe clamp apparatus comprising:
   a. a pressure block with a first side and a second side wherein said pressure block includes a cable side slot and a cable stop recess, said pressure block configured for application of pressure to a first pipe and a second pipe wherein said first pipe and said second pipe have a top and a bottom;
   b. a cable with a first end and a second end, wherein the first end is configured for connection to the first side of said pressure block such that said cable contacts the top of said first pipe and said second side of said pressure block and said top of said second pipe and wherein said second end of said cable is configured for connection with the first side of said pressure block wherein a cable stop connected with said cable and wherein said cable is configured to pass through said cable side slot and said cable stop is configured to fit within said cable recess such that said cable is removably connectable with said pressure block, wherein there are multiple cable stops on one end of said cable;
   c. a pressure applicator connected with said pressure block; and
   d. a pipe alignment guide connected with said pressure applicator wherein said pipe alignment guide is configured to contact the bottoms of the first pipe and the second pipe such that operation of said pressure applicator tightens the connection of the cable stop within said cable stop recess such that said cable is connected with pressure block and tightens the connection with the first pipe and the second pipe and such that said first pipe and second pipe are aligned with each other along said pipe alignment guide.

10. The apparatus of claim 9 further including a second pipe alignment guide connected with the cable and the two separate pipes and opposite the pipe alignment guide.

11. The apparatus of claim 9 wherein the pressure applicator includes a weld gap spacer.

12. The apparatus of claim 9 wherein operation of said pressure applicator forces said pressure block away from said pipe alignment guide.

13. The apparatus of claim 9 wherein a first cable stop is connected with the first end and a second cable stop is connected with the second end and wherein said first and second cable stops are removable connectable with said pressure block.

14. The apparatus of claim 9 wherein said cable consists of two separate sections.

15. The apparatus of claim 9 wherein said pressure applicator is selected from a group consisting of: a threaded screw arm and a ratchet arm.

16. The apparatus of claim 9 wherein the pipe alignment guide is V-shaped.

17. A pipe clamp method consisting of:
   a. providing a pressure block with a first side and a second side, said pressure block configured for application of pressure to a first pipe and a second pipe wherein said first pipe and said second pipe have a top and a bottom; a pipe wrap with a first end and a second end, wherein the first end is configured for connection to the first side of said pressure block such that said pipe wrap contacts the top of said first pipe and said second end of said pressure block and said top of said second pipe and wherein said second end of said pipe wrap is configured for connection with the first side of said pressure block wherein said pipe wrap is a flexible cable and wherein a cable stop is connected with the first end and the second end and wherein said cable stops are removably connectable with said pressure block and wherein there are multiple cable stops on one end of said flexible cable; a pressure applicator connected with said pressure block and a pipe alignment guide connected with said pressure applicator wherein said pipe alignment guide is configured to contact the bottoms of the first pipe and the second pipe such that operation of said pressure applicator tightens the connection of the pipe wrap with the first pipe and the second pipe and such that said first pipe and second pipe are aligned with each other along said pipe alignment guide; and
   b. wrapping said pipe wrap around said first pipe and said second pipe.

18. The method of claim 17 further including operating said pressure applicator until the first pipe is aligned with the second pipe and then welding the first pipe and the second pipe together.

19. The method of claim 17 wherein the pressure applicator includes a weld gap spacer.

* * * * *

UNITED STATES PATENT AND TRADEMARK OFFICE
CERTIFICATE OF CORRECTION

| | | |
|---|---|---|
| PATENT NO. | : 11,292,104 B1 | Page 1 of 1 |
| APPLICATION NO. | : 17/356739 | |
| DATED | : April 5, 2022 | |
| INVENTOR(S) | : William Mank and Matthew Brunnig | |

It is certified that error appears in the above-identified patent and that said Letters Patent is hereby corrected as shown below:

In the Claims

In Claim 9, Column 7, Line 33: "wherein a cable stop connected with said cable" should read --wherein a cable stop is connected with said cable--

In Claim 13, Column 8, Line 9: "wherein said first and second cable stops are removable connectable with said pressure block." should read --wherein said first and second cable stops are removably connectable with said pressure block.--

Signed and Sealed this
Sixteenth Day of September, 2025

Coke Morgan Stewart
*Acting Director of the United States Patent and Trademark Office*